United States Patent
Andersen et al.

(10) Patent No.: US 7,147,881 B2
(45) Date of Patent: Dec. 12, 2006

(54) METHOD FOR PRODUCING A COMPOSITE DOUGH-BASED PRODUCT

(75) Inventors: Erik Hedemann Andersen, Elsinore (DK); Anders Ekberg, Volketswil (CH); Luis Roberto King, Pully (CH)

(73) Assignee: Nestec S.A., Vevey (CH)

( * ) Notice: Subject to any disclaimer, the term of this patent is extended or adjusted under 35 U.S.C. 154(b) by 373 days.

(21) Appl. No.: 10/420,052

(22) Filed: Apr. 17, 2003

(65) Prior Publication Data

US 2003/0203094 A1  Oct. 30, 2003

Related U.S. Application Data

(63) Continuation of application No. PCT/EP01/11818, filed on Oct. 11, 2001.

(30) Foreign Application Priority Data

Oct. 17, 2000  (EP) .................................. 00203590

(51) Int. Cl.
*A21D 8/02* (2006.01)
(52) U.S. Cl. ...................... 426/272; 426/502; 426/549; 426/550; 426/560
(58) Field of Classification Search .................. 426/94, 426/272, 502, 549, 550, 560
See application file for complete search history.

(56) References Cited

U.S. PATENT DOCUMENTS

| 5,514,397 A | 5/1996 | Shapiro ...................... 426/249 |
| 5,558,890 A | 9/1996 | Brown et al. .................. 426/94 |
| 6,419,965 B1 * | 7/2002 | Douaire et al. ............... 426/19 |

FOREIGN PATENT DOCUMENTS

| WO | WO/97/06691 | 2/1997 |
| WO | WO/97/25871 | 7/1997 |
| WO | WO/00/59309 | 10/2000 |

* cited by examiner

*Primary Examiner*—Arthur L. Corbin
(74) *Attorney, Agent, or Firm*—Bell, Boyd & Lloyd LLC

(57) ABSTRACT

A method for making a composite dough by preparing a wheat dough by mixing wheat flour, fat and water in a manner effective to form an homogeneous and cohesive gluten structure followed by sheeting the dough into a sheet; separately preparing a non-wheat dough by mixing a non-wheat flour and water to form a homogeneous mass of dough that is sufficiently cohesive to be subsequently handled; assembling the wheat dough with the non-wheat dough; and laminating the wheat and non-wheat doughs to form a composite dough.

19 Claims, No Drawings

METHOD FOR PRODUCING A COMPOSITE DOUGH-BASED PRODUCT

CROSS-REFERENCE TO RELATED APPLICATIONS

This application is a continuation of the US national stage of International Application PCT/EP01/11818 filed Oct. 11, 2001, the content of which is expressly incorporated herein by reference thereto.

BACKGROUND ART

The invention relates to a method for producing a novel texture of dough-based product, in particular, which can be processed in a sheeting line as a usual dough. The invention relates more particularly to a dough-based product including specific textural characteristics and the taste of non-wheat flour. The dough-based product of the invention is more particularly, although non-exclusively, related to frozen or chilled dough or bread-type products.

A bread-type product is made by baking a dough which has for its main ingredients wheat flour, water, yeast, salt and other possible ingredients. When these ingredients are mixed in correct proportions, three processes commence: (i) the protein in the flour begins to hydrate to form gluten, (ii) air bubbles are folded into the dough trapped in the gluten network and (iii) enzymes in the yeast start to ferment to produce carbon dioxide which diffuses into the air bubbles and brings about expansion of the dough. The role of gluten in the bread-making process is important. The gluten forms the continuous three-dimensional structure of the dough. It has peculiar extensible elastic properties: it can be stretched like elastic and possesses a degree of resilience.

The use of non-wheat flours or starches in bread-type dough is known. Raw materials such as rye, oat and barley flours are traditionally associated with bread or dough-making. Non-traditionally, raw materials such as maize, rice or tapioca flour have been used as possible wheat replacers in the composition of dough for making bread. This approach, motivated either by economic or nutritional considerations, has mostly overlooked the potential for "exotic" raw material as agents of texture in the creation or modification of bread.

Most of the previous studies in bakery have been focused on bread and on mimicking as far as possible the texture and appearance of "normal" wheat bread. Since no other flour has the bread-making ability of wheat flour, any substitution results in a loss of the desirable sensory and textural properties associated with wheat bread. A usual conclusion in most of the existing literature is that starch can be replaced only by rye or barley starch in bread (Hoseney, R. Carl. 1992. Physical Chemistry of Bread Dough. In *Physical Chemistry of Foods*, Schwartzberg H. G. and Wartel. W. H (eds.), pp. 445, Marcel Dekker, New York).

In usual replacement of the wheat flour, the non-wheat flour or starch is dry-mixed with wheat flour and the dough-making process is carried out including mixing with water, salt and other ingredients, optionally fermenting, sheeting and optionally final proofing the dough before baking it. The resulting dough is frequently weaker and its ability to be handled in a sheeting/make-up line diminishes by comparison to the well-controlled textural properties of wheat dough. Usually, the dough becomes non-machinable in conventional rolling lines when the amount of non-wheat flour exceeds 15 wt. % of the total flour content. As a result, the beneficial textural, nutritional and taste features of non-wheat flour have been largely overlooked in industrial bakery field or at least only exploited to a minor extent in the dough; i.e., only as replacer in relatively small proportions (less than 15 wt. %), which has proved to be ineffective to emphasize the specific benefits of the "exotic" flours.

It is also known to make non-wheat bread by replacing the gluten structure of wheat by gluten substitutes having binding functions and film forming properties to retain gas bubbles such as xanthan gum, carboxy methyl cellulose (CMC), hydroxy propyl methyl cellulose (HPMC), hydrocolloids or surfactants (Kent's Technology Of Cereals, Fourth Edition, N. L. Kent and A. D. Evers, Pergamon, p. 215). However, these added components have a tendency to provide a chewy and non-crispy texture.

WO 00/59309 relates to a multi-layer toaster product comprising a first layer and a second layer wherein the first and second layers are constructed of dissimilar materials. The product is a toaster product having enhanced organoleptic properties which is more likely a freshly based cookie, and/or dessert and which is suitable for use in a vertical toaster. The first and second layers are simply assembled by binding but it does not result in a composite bread-type product.

WO 97/25871 relates to a laminated and/or flaky and/or extruded dough product comprising a main strip of a first dough and additional dough pieces made of at least one second dough into the main strip. The invention is primarily to superficially add a second dough of higher viscosity on a main band of dough but the dimensions and thickness of the dough band remains unchanged. The first and second doughs are both based on wheat flour.

Accordingly, there is a need for new dough products that have desirable textural characteristics and the taste of non-wheat flour. The present invention now provides such products.

SUMMARY OF THE INVENTION

The present invention now offers the possibility of creating a wide range of novel textures and tastes to make a crispy bread-type dough that retain the unique characteristics of non-wheat flour while still keeping the ability of the dough to be handled during sheeting and laminating steps usually carried out in the dough-making process.

Another advantage of the invention is that the consumer can benefit more largely from the nutritional, textural and other specific features of non-traditional non-wheat ingredients but in a well-structured dough product.

These dough products develop a satisfactory structure by proofing and baking as a normal bread but they can optionally be frozen without loss of their textural characteristics.

One aspect of the invention relates to a method for industrial making a bread-type dough which comprises preparing a wheat dough by mixing wheat flour, fat and water in a manner effective to form an homogeneous and cohesive gluten structure followed by sheeting the dough into a sheet; separately preparing a non-wheat dough by mixing a non-wheat flour and water to form a homogeneous mass of dough that is sufficiently cohesive to be subsequently handled; assembling the wheat dough with the non-wheat dough; and laminating the wheat and non-wheat doughs to form a composite dough.

DETAILED DESCRIPTION OF THE PREFERRED EMBODIMENTS

This invention incorporates non-wheat flour as a dough rather than as a flour into an already prepared wheat dough as opposed to the prior art which considers non-wheat dough merely as a replacer of wheat flour in the preparation of the dough. It has been surprisingly found that the resulting dough structure is easy to handle in the sheeting line and leads to a well-developed dough product. By using this method, novel textures can be created that cannot be obtained using non-wheat flour alone as a replacer of wheat flour in the usual dough preparation.

As another advantage, excessive handling can also be avoided successfully by minimum laminating of the wheat dough and non-wheat dough together while forming one integrated composite dough with unique textural properties.

In a preferred aspect of the invention, the wheat dough is used as a carrier of the non-wheat dough and the non-wheat dough is used as the dominant component of the final dough product to thereby influence the texture and taste to the resulting dough product. For that, the proportion of wheat dough: non-wheat dough ranges respectively, of from 20:80% to 40:60% by weight, preferably of from 30:70 to 35:65% by weight of the total dough product. It has so been surprisingly found that according to the method of the invention, up to 80% non-wheat dough could be combined while keeping a final dough with sufficiently well developed characteristics capable of being processed in usual dough-making production lines. By using such a large amount of non-wheat dough, i.e., consequently leading to use large amount of non-wheat flour, it is so possible to create novel textures that cannot be obtained using wheat flour alone or small amounts of wheat dough replacers.

The structure of the non-wheat dough is created by partially gelatinized starch before assembling so its level of structure is not as high as for a gluten network. However, the gluten structure of the wheat dough has proved to be sufficient to serve as a proper support for the relatively unstructured non-wheat dough.

The term "dough" in the present invention refers to the cohesive product that results from the mixture, eventually after subsequent proofing, of flour or starch, water along with possibly fats and other usual ingredients normally entering in the composition of usual dough such as salt, yeast or chemical leavenings, fibers, egg proteins, milk proteins and sugar. The addition of fibers in smaller amounts may be suitable to improve the handling properties of the non-wheat dough. The fibers may be potato fibers or other suitable fibers.

In the present invention, "sheeting" refers to the action of rolling or extending a discrete piece of dough to form a sheet of dough. "Laminating" refers to the action of forming a laminate by superimposing several sheets or layers of dough. "Mixing" refers to the actions of doing a blend and kneading the ingredients of the dough.

An essential structural ingredient forming component for most non-wheat raw material is starch. It has been found important to have the starch partially gelatinized in order to obtain a dough-like consistency for the non-wheat dough. Partial gelatinization of the non-wheat starch may be obtained by mixing the non-wheat flour with a hot aqueous liquid such as water or water and oil. Starch gelatinization of non-wheat flour normally requires heat and water to occur. Therefore, starch gelatinization may be obtained either during the mixing step by adding hot water or before mixing by soaking the flour in hot or boiling water or steaming. The degree of gelatinization greatly depends on the type of flour and the process conditions. As resulting from a proper degree of gelatinization of the starch, the non-wheat phase becomes "workable" under the form of a dough that is capable of being flattened into a substantially cohesive block or layer of non-wheat dough. The dough should preferably be capable of being flattened to form a block of thickness of from 5 to 30 mm.

The choice of the non-wheat flour for the non-wheat dough part depends upon its capability to form a relatively cohesive dough when mixed to an aqueous medium alone or with the other functional ingredients to produce the non-wheat dough part. Other functional ingredients may be fat or oil, fibers, egg, milk proteins or combinations thereof.

Suitable non-wheat flours of the invention are selected among the group consisting of maize, tapioca, rice, fruit, pulse or tuber flours or combinations thereof. Plantain flour (*Musa paradisiaca*) and chickpea flour (*Cirerarietinum*) are suitable examples of fruit and pulse flour. In the specific context of the invention, the traditionally used cereals in bread-making: barley, rye and oat are excluded from the group of non-wheat flour. However, those cereals may be used in partial or total replacement of the wheat flour when preparing the wheat dough part. As "cohesive" dough, it is referred to the capability of the non-wheat dough to be handled as a continuous mass when laminating it onto the wheat dough. However, most non-wheat dough cannot normally be sheeted and further laminated by themselves.

The non-wheat flour as selected preferably contains a wide range of starch granule sizes of from 2 to 50 microns. The starch granules may vary from small sizes of 2–10 microns for rice to large sizes of 10–50 microns for plantain. However, the method of the invention is not specifically limited to flours of any specific granule size.

The non-wheat dough is made essentially from non-wheat flour although a minor amount of wheat flour may be envisaged as for increasing its workability (elasticity and extensibility). In general, it has been shown that the non-wheat dough part should comprises of from 35 to 55% of non-wheat flour, 0 to 25% fat, 20 to 50% water, 0 to 2% salt, optionally egg, fibers and sugar.

The wheat dough may be chosen among various types of dough. Preferably, the wheat dough comprises from 45 to 60% of wheat flour, 1 to 15% fat, 20 to 40% water, 0.1 to 2% salt, optionally egg and sugar.

The percentages of the components mentioned herein are by weight unless otherwise noted.

It is preferred to use wheat flour having good bread making quality. Preferably, the wheat flour should have a relatively high protein content capable of forming a strong gluten structure during its preparation. Although the quality of dough is not only based on the protein content, the protein content of the flour should preferably be of from 5 to 14%, more preferably of from 10 to 14%. The gluten-protein complex is a mixture of a large number of proteins containing about an equal mixture of two basic groups: the prolamins, called gliadin, and the glutelins, called glutenin. The mixture of the gliadins and glutenins give gluten its viscoelastic properties. Additives may be added to the dough composition in order to reinforce the tenacity of the gluten network that are known in the art such as ascorbic acid, lecithin, vitamins or others.

Preferred fat used in the dough recipes is selected from the group consisting of solid shortenings or oil. Preferred shortening compositions include margarine, butter fat or lard.

Oils may include vegetable or animal oils. Vegetable oils are preferred such as rapeseed, corn, peanut, palm, palm-kernel, sesame, soybean, sunflower or olive oil.

In the present invention, the wheat flour primarily refers to soft wheat or *Triticum aestivum* although a certain amount of hard wheat, or *Triticum durum* may also be used.

Non limitative models of the portion of wheat dough suitable for the invention are, in particular: pizza dough, piroq dough or pastry dough.

Pizza dough is lean elastic wheat-based low-fat dough that functions well as a carrier for the non-wheat dough. During lamination with the non-wheat dough, the resulting overall dough structure shows no sign of breaking, even at low levels of wheat dough (30–35%).

Bulk fermentation of the pizza dough is necessary to achieve a well developed cellular structure of the final ferment in batch before assembling to the portion of non-wheat dough. A second proofing is also needed after combining and laminating the wheat dough with the non-wheat dough to relax the resulting dough before baking. A second proofing has shown a better integration of the two types of dough together due probably to the production of carbon dioxide that swells the resulting dough to a certain extent due to the elastic and resistant structure of gluten that has been formed during mixing.

Piroq dough is a short dough, somewhat drier and less elastic than pizza dough, but it has proved to be a suitable carrier with good results as a level of at least 30% by weight. Piroq dough is a yeast containing dough that also requires proofing before assembling to the non-wheat dough part and a second proofing after sheeting and laminating with non-wheat dough.

Pastry dough is a fat-containing dough that functions well as a carrier with good elasticity and extensibility. During lamination, the final pastry/non-wheat dough shows no sign of breaking even at low levels (30–35% of pastry dough). Fat has a tendency to make a softer and shorter texture. However, the elastic properties are kept sufficiently good when the fat content of the dough is relatively low, preferably under 30% by weight of fat.

In the preparation and mixing stages, the wheat and non-wheat dough are processed independently. The dough parts may be separately mixed in a standard spiral mixer such as a Kemper mixer. The wheat dough part provides primarily the structure and strength to the final dough product. The wheat dough is prepared in a usual manner known in the art including dry mixing of the dry ingredients, in particular flour, salt and, if needed, shortening, yeast and sugar. Then, the liquid ingredients are added to the dry mixture such as water and oil and mixing is carried out within a limited time to develop a proper gluten structure in the wheat dough.

Mixing is important both for wheat and non-wheat dough as it provides hydration of the flour and air incorporation into the dough. Hydration of the flour promotes the formation of fibrils whereas incorporation of air forms the nuclei that determine the number of cells in the finished bread. Mixing is carried out until a suitable resistance to extension is obtained. Proofing of the wheat dough and non-wheat dough may be necessary to achieve a good cellular texture. Then, a properly weighted wheat dough part is sheeted independently such as in a standard sheeting apparatus and then, a metered amount of non-wheat dough is added onto it in a flattened block much the same way fat would be added to laminated dough.

The laminating step is used as a manner to carry out an efficient homogeneous mixing procedure of the two types of dough together while creating a gluten network effective for giving support for the starch gel of the non-wheat phase. Laminating consists of placing a flat block or layer of non-wheat dough on top of a sheet of wheat dough to form at least two wheat/non-wheat superposed layers. In a preferred aspect, the sheet of non-wheat dough is further covered by a sheet of wheat dough so as resulting in a three-layer laminate comprising wheat/non-wheat/wheat dough layers. Such a laminate can be obtained, for example, by simply providing a wheat dough layer of larger dimensions than the dimensions of the flattened block of non-wheat dough, and then, wrapping the layer of non-wheat dough at least partially with the lower layer of wheat dough so as to create an upper layer of wheat dough on the top of the non-wheat dough. Of course, the number of layers is not limited and more than three layers could be made for the laminate. However, it is preferred to have the non-wheat dough supported on each side by a wheat dough when laminating.

Then, folding and laminating several times the laminate can be carried out and rolling to final thickness and cutting to final dimensions and shapes. Folding and sheeting up may be carried out preferably at least 6 times (corresponding to 26 or 64 leaves of dough) to effect a good mixing of the two doughs together. By "good mixing" it is meant that no significant separation of layers occurs during baking. Therefore, the resulting bread should not present a laminate or layered structure but rather an homogeneous structure without visible discrete regions of the non-wheat dough. The thickness of the final sheet of dough may depend on the final bread product to be obtained (for example, a thin or thick pizza-type crust, etc.). Therefore, the thickness reduction plan is usually designed with a specific product in view. Generally, the thickness of the dough is comprised between 1 to 6 mm.

If the dough contains yeast, after portioning or cutting to the desired shape such as round or square shapes, the dough pieces are allowed to proof for 15 to 60 minutes. Then, the dough is ready for storing or baking. The dough may be stored as a chilled or frozen ready-to-bake dough product in an appropriate packaging such in an impervious, gas flushed, plastic bag. When the dough product is to be frozen, it is proceeded in a freezing tunnel or a blast freezer at from −18 to −25° C. In a variant, the dough may be baked to form a partially or fully cooked bread, optionally frozen, and stored afterwards.

The present invention also offers large opportunities to create novel snack products of bread type with various fillings such as meat and sauce and/or vegetable fillings.

EXAMPLES

The following examples illustrate the present invention without limiting its scope.

Example 1

Maize Dough

A Tamal dough is prepared using nixtamalised maize flour. The term "nixtamalised" refers to the traditional method of processing maize in Mexico and Guatemala in order to produce tortillas. The process is a partial precooking and soaking of the maize kernels in an alkaline solution to release the bound niacin and make it biologically available. The maize can then be either wet-milled to produce "masa" or dry-milled to produce tortilla flour. The resulting maize flour is mixed with water in a Kemper mixer during 5 minutes to form a base dough. The rest of the ingredients are added and mixed during 5 minutes again. Bulk fermentation of the maize dough, as resulting after mixing in a block of dough, is carried out at a temperature of 18–22° C. for 10 minutes.

The Tamal dough is very short dough (i.e., not extensible but paste-like) but relatively easy to laminate into a wheat dough. Preferred amount of Tamal dough is 65 to 75% by weight.

The ingredients and proportions for the Tamal dough are as follows:

| Ingredients: | % by weight: |
|---|---|
| Nixtamalised maize flour: | 40.123 |
| Water | 40.237 |
| Shortening | 12.225 |
| Salt | 0.498 |
| Yeast | 4.714 |
| Egg white, powdered | 2.203 |
| Total: | 100.00 |

Example 2

Rice Dough

Waxy or "glutinous" rice has been identified as the most promising type of rice for the dough formation. It is presumably the high content of amylopectin around 80 wt % (as opposed to 60–65 wt % for a standard rice dough) that helps to produce a relatively well structured dough. Waxy rice is usually used for making noodles and dumplings in Eastern Asia. Our tests were started with a simplified rice dumpling dough: *Oryza sativa* (used for noodles in Asia). The dry ingredients are added to boiling water in a Björn vertical mixer. Mixing time is short, around 3 minutes on low speed. After mixing, the dough is cooled down to 17–20° C. before lamination. Cooling down can be sped up when rolling the dough in a layer with a thickness of about 50 mm. The dough is relatively sticky but is relatively simple to laminate it into a wheat dough because of its good elasticity and extensibility. Lamination is performed in a Rondo sheeting line. Alternatives for reducing stickiness have been tested, the best solution being to chill the dough before laminating (at chilled temperature below 12° C.). The preferred proportion of rice dough is of 65 to 75% w/w of the final wheat/non-wheat dough product.

The ingredients and proportions for the rice dough are as follows:

| Ingredients: | % by weight: |
|---|---|
| Waxy Rice flour | 41.841 |
| Potato Flour | 4.494 |
| Potato Fiber | 0.280 |
| Salt | 0.280 |
| Sugar | 0.200 |
| Water | 52.905 |
| Total: | 100.00 |

Example 3

Tapioca Dough

Tapioca flour (*Manihot utilissima*) is widely used as a source of flour or starch in tropical areas. Most tapioca products are either steamed or fried.

The tapioca dough was prepared by boiling water and oil and mixed together with tapioca starch for 4 minutes in a Kemper spiral mixer. The mixture is left at rest for cooling for 15 minutes at ambient temperature (20° C.) to obtain partial starch gelatinization. Then, it is added to the rest of dry ingredients (salt, yeast, margarine) and wet ingredient (whole egg) and mixing is maintained for 5 minutes in spiral mixer.

The dough is very short but easy to handle during lamination. The preferred amount was in the range of 65–70% w/w of the assembled dough.

The ingredients and proportions for the tapioca dough are as follows:

| Ingredients: | % by weight |
|---|---|
| Rapeseed oil | 10.276 |
| Water | 25.590 |
| Salt | 0.580 |
| Tapioca starch, native | 51.799 |
| Frozen whole egg | 4.558 |
| Yeast | 2.059 |
| Margarine | 5.138 |
| Total | 100.00 |

Example 4

Wheat Dough

Three different types of dough were chosen as carriers for the non-wheat dough with the aim of covering the small meal range.

Specific ingredients for respectively pizza dough, a piroq dough and a pastry dough are given respectively by order:

| Ingredients: | % by weight |
|---|---|
| Pizza dough: | |
| Wheat flour (13.6% protein) | 58.635 |
| Water | 33.227 |
| Yeast | 2.939 |
| Rapeseed oil | 1.759 |
| Sugar | 1.180 |
| Salt | 1.180 |
| Malt powder | 1.080 |
| Total: | 100.00 |
| Piroq dough: | |
| Wheat flour (13.6% protein) | 59.028 |
| Margarine | 9.838 |
| Yeast | 2.460 |
| Salt | 1.040 |
| Sugar | 1.360 |

-continued

| Ingredients: | % by weight |
|---|---|
| Fat powder | 2.460 |
| Water | 23.814 |
| Total: | 100.00 |
| Pastry dough: | |
| Water | 23.392 |
| Wheat flour (13.6% protein) | 51.462 |
| Frozen whole egg | 9.357 |
| Yeast | 3.509 |
| Sugar | 2.339 |
| Salt | 0.234 |
| Pastry margarine | 9.707 |
| Total | 100.00 |

Example 5

Wheat and Non-wheat Dough Assembling

The three types of wheat dough as described in example 4 were successively combined to the three types of non-wheat dough as described in examples 1 to 3. The number of combinations was of six different wheat/non-wheat dough products. For each possible combination, one flattened block of non-wheat dough was placed on top of the rolled-out wheat dough of larger overall dimensions. The underneath wheat dough layer was used to wrap the non-wheat dough so as to substantially cover the all faces of the non-wheat dough. After wrapping, 2-by-3 lamination (representing 6 folds) of the product was carried out in a Rondo sheeting line. All the six tested non-wheat/wheat combinations presented in the previous examples had a good workability in the Rondo sheeting line with no break or rip when subjected to the stresses of the sheeting line. Rolling out to final thickness could also be properly carried out.

Topping or filling of the dough was carried out. Topping of the dough consisted of layering a sauce, cheese or other ingredients on top of the dough piece (like a pizza or pie). "Filling" means that the ingredients are enclosed within the dough (such as in pirogi). Final proofing of the final dough was performed. Proofing conditions were dependent upon the dough type.

For example, for tamal-pizza dough: the proofing was 45 minutes at 35° C./75% HR; for tamal-piroq dough: the proofing was 35 minutes at 35° C./75% RH; for tamal-pastry dough: the proofing was 30 minutes at 35° C./75% RH.

Depending upon the final type of bread and the degree of cooking desired, the dough was then baked during 9–12 minutes at 190–200° C. for 5–8 sec. Steam may be used for 5–8 seconds at the end of baking to reduce surface cracking.

The resulting breads were frozen in a blast freezer at −25° C. and then packed in plastic bags.

Example 6

Sensory Test

The effect of the addition of tapioca dough (according to the recipe of example 3) to pizza dough (example 4) was sensory tested. For that, a panel of trained and experienced twelve members were presented three samples of bread; a reference sample consisting of 100% of wheat dough; a dough consisting of 25% tapioca dough and 75% pizza dough and; a dough consisting of 50% tapioca and 50% pizza dough. The evaluation was done by selecting a number of attributes and providing marks to the samples from 0 to 10. The test was repeated three times. The attribute were:

"Volume" which refers to the visual impression on how the bread has risen after baking;

"brittleness" is defined by the tendency of the product to produce crumbs when bitten into it;

"firmness" which refers to capability of the bread to offer a certain resistance when biting; a crunchy bread will be well marked whereas a spongy one will be poorly marked;

"crispiness" is judged by how much sounds it makes when one bites into the product;

"compacity" refers to the capability of the bread to hold in one piece in the mouth when chewing.

The results are given below under the form of an average 0–10 scale:

| Attributes: | Reference 100% wheat | 25% tapioca 75% wheat | 50% tapioca 50% wheat |
|---|---|---|---|
| Volume | 8.28 | 5.73 | 5.73 |
| Brittleness | 2.78 | 6.67 | 5.44 |
| Firmness | 3.86 | 5.56 | 4.97 |
| Crispiness | 4.15 | 6.87 | 6.38 |
| Compacity | 6.46 | 4.62 | 5.44 |

The addition of tapioca dough creates a much less compact, crispier texture even at 25% level of inclusion. Addition of higher level of tapioca results in a less firm product but crispiness is maintained. This illustrates the possibilities of creating a tailor-made texture by combining different levels of wheat and non-wheat dough.

What is claimed is:

1. A method for making a composite homogeneous dough which comprises:
    preparing a wheat dough by mixing wheat flour, fat and water in a manner effective to form a homogeneous and cohesive gluten structure followed by sheeting the dough into a sheet;
    separately preparing a non-wheat dough by mixing a non-wheat flour and water to form a homogeneous mass of dough that is sufficiently cohesive to be subsequently handled;
    assembling the wheat dough with the non-wheat dough, and
    laminating, folding and sheeting the assembled wheat and non-wheat doughs to form a composite homogeneous dough without visible discrete regions of the non-wheat dough.

2. The method according to claim 1, wherein the wheat and non-wheat dough structures are present in a weight ratio of from 20:80 to 40:60 in the composite dough product.

3. The method according to claim 1, which further comprises partially gelatinizing the non-wheat flour prior to assembling.

4. The method according to claim 3 wherein the non-wheat flour is gelatinized during mixing by adding water that is sufficiently hot to effect gelatinization.

5. The method according to claim 3 wherein the non-wheat flour is gelatinized by soaking the non-wheat dough in boiling water or by steaming the non-wheat dough.

6. The method of claim 1 wherein the wheat dough comprises from 45 to 60% by weight of wheat flour, 1 to 15% by weight fat, 20 to 40% by weight water, 0.1 to 2% by weight salt and, optionally, egg or sugar.

7. The method according to claim 1, wherein the non-wheat dough comprises from 35 to 55% by weight of non-wheat flour, 0 to 25% by weight fat, 20 to 50% by weight water, 0 to 2% by weight salt and, optionally, egg or sugar.

8. The method according to claim 1, wherein the assembling includes forming the mixed non-wheat dough into a cohesive flattened block and layering the block on top of the wheat dough sheet.

9. The method according to claim 1, which further comprises including yeast in the wheat dough, the non-wheat dough, or both and proofing the composite dough after laminating.

10. The method according to claim 1, wherein the non-wheat flour is maize, tapioca, rice, fruit, pulse or tuber flour.

11. The method according to claim 10 wherein the composite dough is laminated several times in a sheeting line prior to rolling to the final thickness and cutting individual portions of dough.

12. The method according to claim 1, wherein the laminating is carried out at least 6 times to effect good mixing of the wheat and non-wheat doughs.

13. The method according to claim 1, wherein the fat is selected from the group consisting of solid shortenings or oils.

14. The method according to claim 1, wherein the assembling comprises placing a layer of non-wheat dough on top of a wheat dough sheet followed by folding, and the laminating is conducted several times, and is followed by rolling to final thickness and cutting to final dimensions.

15. The method according to claim 14, wherein prior to folding, the assembling further comprises covering the layer of non-wheat dough by another wheat dough sheet to obtain a three-layer structure comprising wheat/non-wheat/wheat dough layers.

16. The method according to claim 1, which further comprises chilling the non-wheat dough part before laminating.

17. The method according to claim 1, which further comprises baking the composite dough to form a baked product.

18. The method according to claim 1, which further comprises freezing the composite dough for storage prior to baking.

19. The method according to claim 1, которой further comprises chilling the composite dough product.

* * * * *